(12) United States Patent
Satoh et al.

(10) Patent No.: US 6,556,374 B1
(45) Date of Patent: Apr. 29, 2003

(54) SPINDLE MOTOR-HAVING IMPROVED BONDING BETWEEN ITS BEARING CARTRIDGE AND HUB

(75) Inventors: Kiyoshi Satoh, Ayase (JP); David W. Albrecht, Fujisawa (JP); Sunao Nemoto, Fujisawa (JP)

(73) Assignee: Hitachi Global Storage Technologies, Amsterdam (NL)

( * ) Notice: Subject to any disclaimer, the term of this patent is extended or adjusted under 35 U.S.C. 154(b) by 730 days.

(21) Appl. No.: 08/825,449

(22) Filed: Mar. 28, 1997

(30) Foreign Application Priority Data

Mar. 28, 1996 (JP) .............................. 8-074854

(51) Int. Cl.⁷ .............................. G11B 17/02
(52) U.S. Cl. .................................. 360/99.08
(58) Field of Search .................. 360/98.07, 98.08, 360/99.08; 310/67 R, 90, 51

(56) References Cited

U.S. PATENT DOCUMENTS

| 4,717,977 A | 1/1988 | Brown ..................... 360/98.08 |
| 5,112,147 A | 5/1992 | Imamura et al. ............ 384/493 |
| 5,138,209 A | 8/1992 | Chuta et al. .............. 310/67 R |
| 5,160,866 A | 11/1992 | Hishida et al. ............... 310/90 |
| 5,227,686 A | 7/1993 | Ogawa ........................ 310/90 |
| 5,430,589 A | 7/1995 | Moir et al. ............... 360/97.02 |
| 5,459,628 A | 10/1995 | Brooks ..................... 360/99.08 |
| 5,517,374 A | * 5/1996 | Katakura et al. ......... 360/98.07 |
| 5,550,689 A | * 8/1996 | Boutaghou et al. ....... 360/99.08 |
| 5,552,650 A | * 9/1996 | Cap et al. ................. 310/67 R |

FOREIGN PATENT DOCUMENTS

| JP | 1-290164 | 11/1989 |
| JP | 2-240889 | 9/1990 |
| JP | 4-360074 | 7/1991 |
| JP | 4-255964 | 9/1992 |
| JP | 4-289749 | 10/1992 |

* cited by examiner

Primary Examiner—David Davis
(74) Attorney, Agent, or Firm—Monica D. Lee; Robert B. Martin

(57) ABSTRACT

A motor having reduced deformation due to a temperature change. The motor is an outer ring type motor having a bearing cartridge, which integrates the shaft, ball bearings and sleeve. The outer periphery of the sleeve is attached to the inner periphery of the hub at a bonding region positioned axially between the ball bearing holding portions. The bonding portion includes a stress reducing region. The diameter of the hub within the stress reducing region is not uniform in order to reduce the stress generated between the outer periphery of the sleeve and the inner periphery of the hub due to thermal expansion.

11 Claims, 5 Drawing Sheets

[Figure 1] (Prior Art)
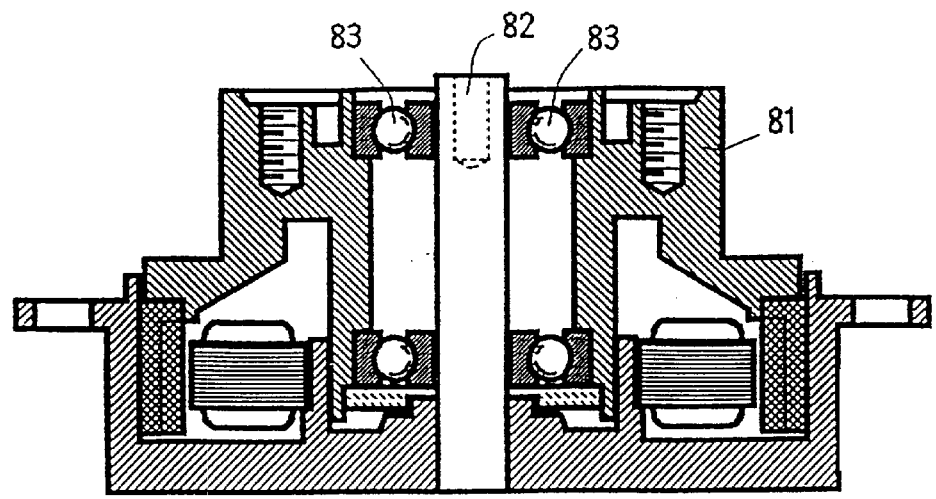
[Figure 2] (Prior Art)
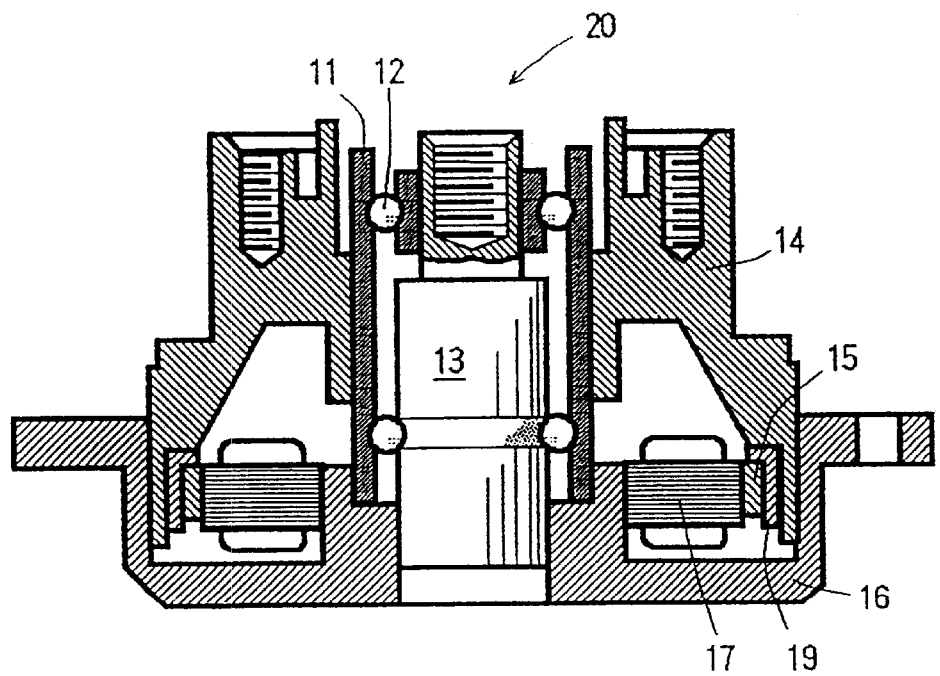

[Figure 3]
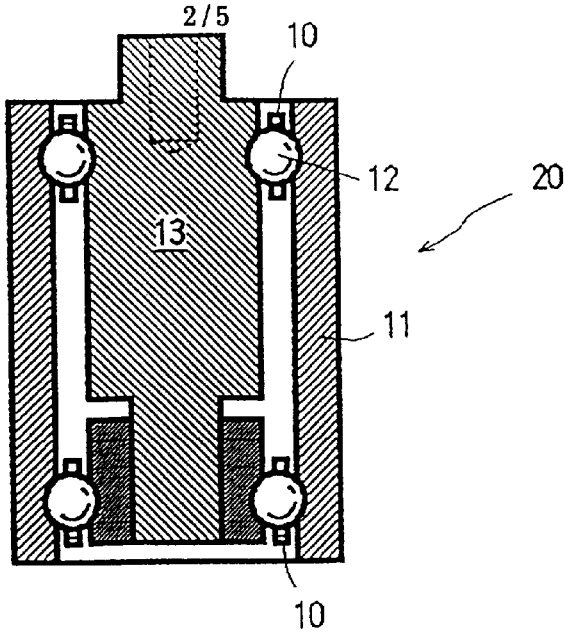
[Figure 4]
(Prior Art)
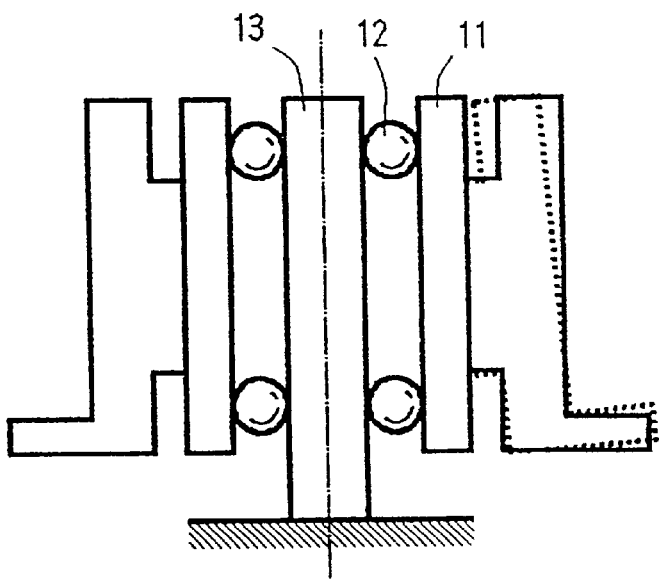

[Figure 5]
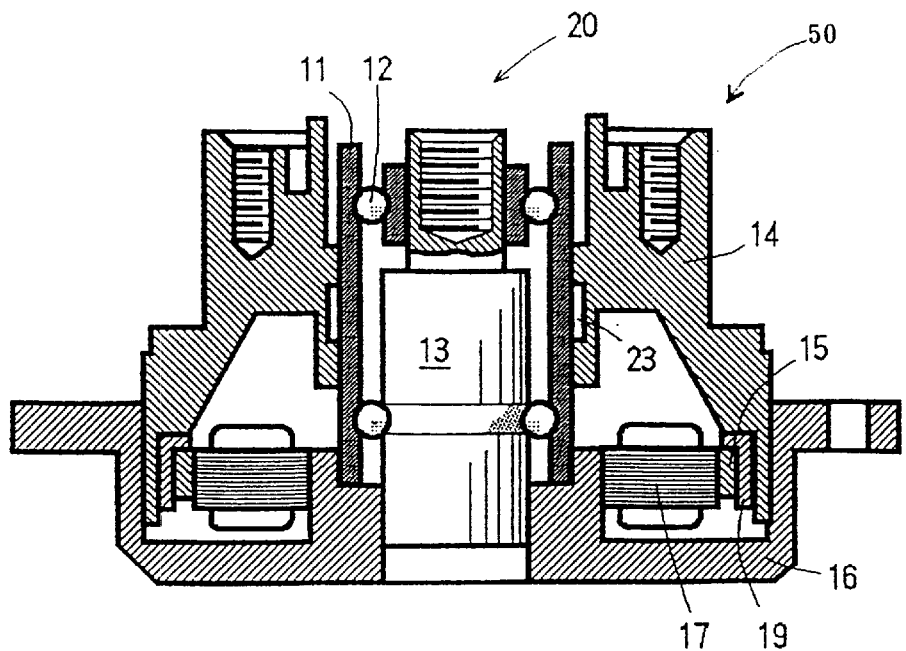
[Figure 6]
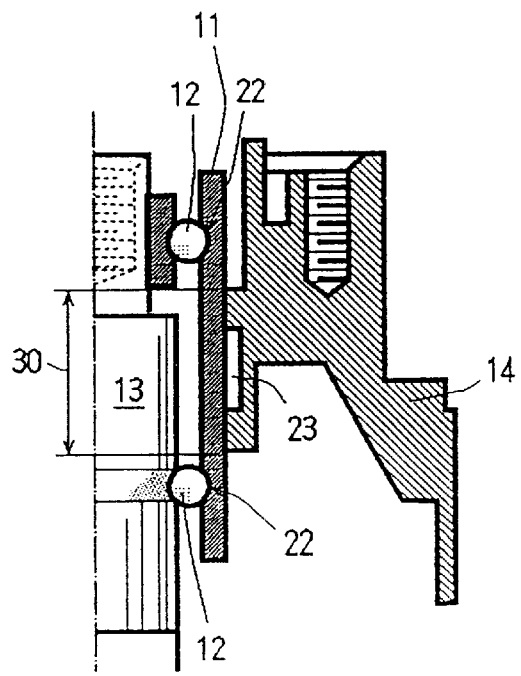

[Figure 7]
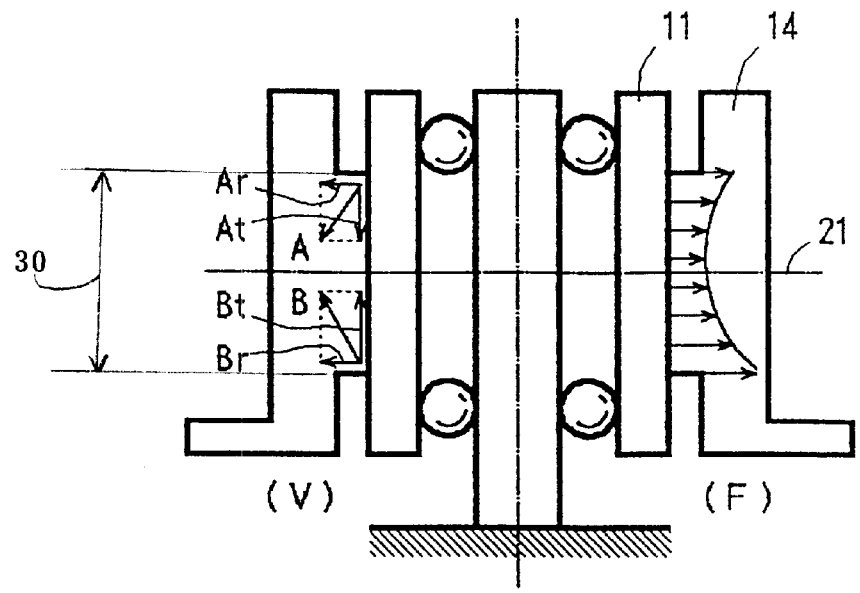
[Figure 8]
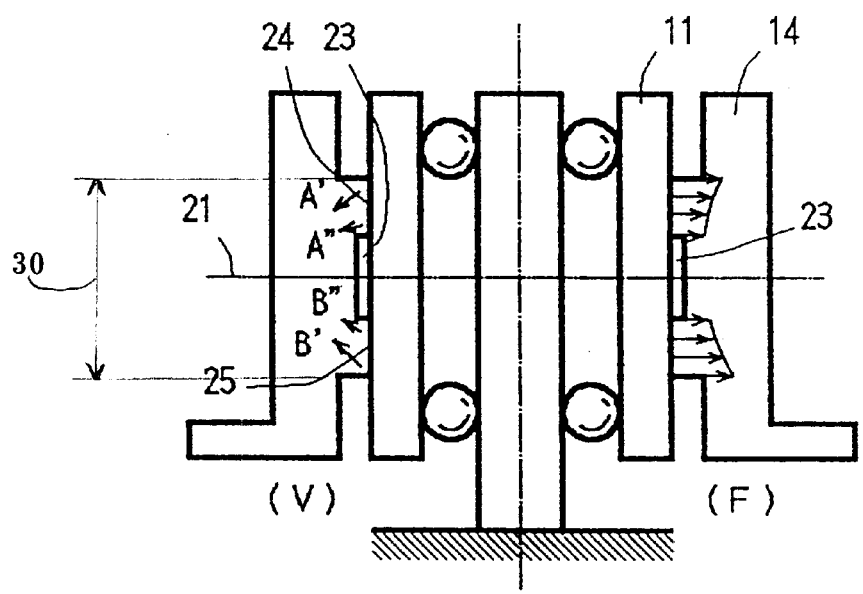

[Figure 9]
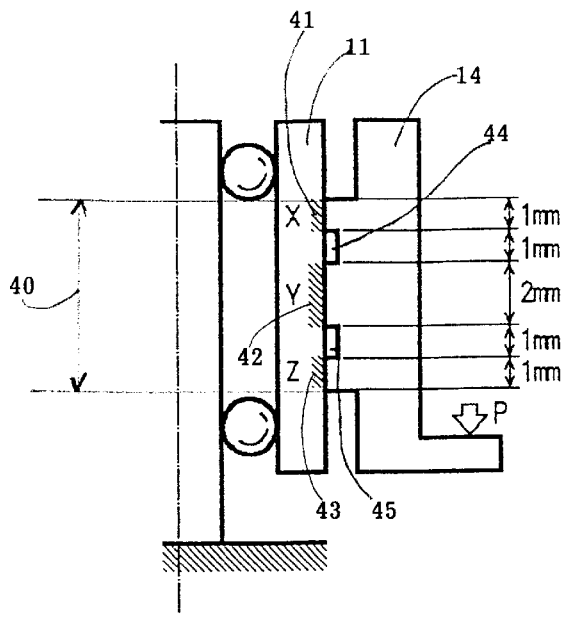
[Figure 10]
| | | A | B | C | D |
|---|---|---|---|---|---|
| Fitting conditions | X | Loose | Tight | Loose | Tight |
| | Y | Loose | Loose | Tight | Tight |
| | Z | Loose | Tight | Loose | Tight |
| | Loose length | 6 mm | 4 mm | 4 mm | 2 mm |
| | Tight length | 0 mm | 2 mm | 2 mm | 4 mm |
| | Loose length / Total length | 100% | 67% | 67% | 33% |
| | Thermal runout | 1.24 μm | 0.36 μm | 0.48 μm | 0.39 μm |

SPINDLE MOTOR-HAVING IMPROVED BONDING BETWEEN ITS BEARING CARTRIDGE AND HUB

BACKGROUND OF THE INVENTION

1. Field of the Invention

The present invention relates to a disk drive apparatus, and more particularly to a structure for fixing a hub to the outer periphery of a spindle motor.

2. Description of Related Art

In a conventional disk drive apparatus, the spindle motor is used as the drive mechanism for rotating a disk. The head of the disk drive apparatus is maintained at a predetermined distance above the disk and positioned at a desired track to read the data recorded on the track or write data to the track. If the rotation of a disk is abnormal (e.g., deviates from the normal rotation around a fixed axis), the tracing of the track by the head may be difficult to perform and an error may occur in the reading or writing of data. This type of error may be referred to as runout. Accordingly, one of the basic performance requirements is to provide consistent high-speed rotation around a fixed axis that minimizes or reduces the likelihood of runout of the disk surface.

Recently, hard disk drives with several disks are used to increase the recording capacity of disk drives. As the number of disks increases, the hub on which the disks are mounted requires a wider surface on which the disks are to be fixed. By increasing the number of disks, the load on the motor also increases. In order to withstand this increased load, an outer ring rotation type motor may be used to support both ends of the shaft. Typically, an outer ring rotation type motor includes a fixed shaft, which is the central axis, and a hub mounted on the outer periphery of the shaft. The hub rotates around the fixed shaft through ball bearings. The disks fixed on the outer periphery of the hub rotate along with the hub.

FIG. 1 shows a cross-sectional view of a conventional outer ring rotation type motor. According to FIG. 1, the outer peripheral surface of the hub 81 is wide enough to mount a plurality of disks. The hub 81 is mounted to the shaft 82, which provides a fixed axis. The ball bearings allow the hub 81 to rotate about the shaft 82. The rotational axis of the hub 81 typically coincides with the central axis of the shaft 82. However, various factors, which are-difficult to control, may affect the normal rotation of the disk. For example, the positioning of the ball bearings, the bonding between a ball bearing and the hub, and the adjustment of the balance of the upper and lower ball bearings.

Errors resulting from the abnormal rotation of the disk may be reduced or eliminated by integrating the shaft, ball bearings, and sleeves into a bearing cartridge. FIG. 3 shows a bearing cartridge. A bearing cartridge 20 typically includes a shaft 13, a sleeve 11, a plurality of ball bearings 12, and a retainer 10 for holding the ball bearings 12 on a ring at equal intervals. Grooves in the shaft 13 and the sleeve 11 are used to hold the ball bearings at a fixed location.

FIG. 2 illustrates a spindle motor with a bearing cartridge 20. The spindle motor includes the bearing cartridge 20, a hub 14 on which disks are to be mounted, a stator 17, a magnet 15, a flange 16, and a yoke 19. The magnet 15 and the yoke 19 are fixed to the hub 14. The inner periphery of the hub 14 is fixed to the outer periphery of the sleeve 11 of the bearing cartridge. The stator 17 is fixed to a flange 16 and is disposed between the shaft and the magnet 15. By fitting the central hole of the disk over the hub 14, the disk is fixed to the hub 14. The hub 14 rotates about the shaft 13 integrally with the sleeve 11.

Generally, the hub is formed of aluminum, and the sleeve of the bearing cartridge is formed of stainless steel. As the temperature changes during the operation of the disk drive, stress due to the difference of thermal expansion between the hub and the sleeve is generated. This stress often causes distortion in the hub.

Generally the disk drive apparatus operates within a temperature range of about 5° C. to 55° C. If distortion occurs in the hub within this temperature range, a thermal runout (i.e., runout due to a temperature change) occurs. The difference in the coefficient of linear expansion between the hub and the sleeve may cause the hub to change in shape. For example, the dotted lines shown in FIG. 4 illustrates the deformation of the hub 14. When the disk mounted on the hub is rotated, such deformation of the hub generates not only an axial runout but also a runout in the direction of the disk plane, causing an error in data reading and writing.

SUMMARY OF THE INVENTION

It is desirable to reduce the deformation of a hub caused by a temperature change.

It is also desirable to reduce the stress produced by a temperature change that occurs in the contact region between the inner periphery of the hub and the outer periphery of the sleeve.

Furthermore, it is desirable to reduce the runout of a disk that occurs when the hub is deformed.

The motor in the disk drive apparatus according to this invention uses a bearing cartridge that integrates a shaft, ball bearings, and a sleeve. The sleeve, which is fixed to the outer periphery of the bearing cartridge, and the hub, integrally rotate about the shaft, which is the central axis. The inner periphery of the hub and the outer periphery of the sleeve are attached in a bonding region between the ball bearing holding portions of the bearing cartridge. At least one stress reducing region or hub is provided in the bonding portion.

In the motor in the disk drive apparatus, the diameter of the inner periphery of the hub, which is bonded to the outer periphery of the sleeve of the bearing cartridge, does not have a uniform length in the bonding region. Specifically, the inner diameter in part of the bonding region is made larger than the remaining part, and this partial region is defined as a stress reducing region. The formation of the stress reducing region enables the reduction of the stress which occurs between the outer periphery of the sleeve and the inner periphery of the hub when thermal expansion is generated by temperature change. Accordingly, the distortion of the hub is reduced.

Other desires, features and advantages of the present invention will be apparent from the accompanying drawings and from the detailed description that follows below.

BRIEF DESCRIPTION OF THE DRAWINGS

The present invention is illustrated by way of example and not limited in the figures of the accompanying drawings, in which like references indicate similar elements, and in which:

FIG. 1 illustrates a sectional view of a conventional outer ring rotation type motor for a disk drive apparatus;

FIG. 2 illustrates a sectional view of a conventional motor structure using a bearing cartridge;

FIG. 3 illustrates a sectional view of a conventional bearing cartridge;

FIG. 4 illustrates the deformation of a hub in a conventional motor structure resulting from a temperature change;

FIG. 5 illustrates one embodiment of a sectional view of an outer ring rotation type motor in a disk drive apparatus;

FIG. 6 illustrates an enlarged view of one embodiment of the bonding region between the hub and the sleeve of a motor;

FIG. 7 illustrates the stress vectors for the bonding region between the hub and the sleeve;

FIG. 8 illustrates the stress vectors for one embodiment when a stress reducing region is provided in the bonding region between the hub and the sleeve;

FIG. 9 illustrates an alternative embodiment of the bonding region between the hub and the sleeve of a motor; and FIG. 10 illustrates the thermal runout for various bonding conditions of the hub and the sleeve.

DETAILED DESCRIPTION OF THE PREFERRED EMBODIMENT

FIG. 5 illustrates one embodiment of the motor in which the present invention is incorporated. The motor 50 is an outer ring rotation type motor having a hub 14 fixed to the sleeve 11, also referred to as a bearing sleeve, of a bearing cartridge 20. The hub 14 and the bearing cartridge 20 rotate about a shaft 13. The shaft 13, the ball bearings 12, and the sleeve 11 are integrated to form the bearing cartridge 20. The disk is fixed to the outer periphery of the hub 14. A magnet 15 and a yoke 19 are also fixed to the hub 14. A stator 17, which is fixed to a flange 16, is disposed between the magnet 15 and the shaft 13. Thus, the magnet 15 is positioned outwardly from the sleeve 11.

A bonding region, which includes at least one stress reducing region, is formed between the hub 14 and the sleeve 11 of the bearing cartridge. The stress reducing region may be an annular recess formed on the periphery of the hub. FIG. 6 illustrates an enlarged view of the bonding region 30 between the hub 14 and the sleeve 11. As shown in FIG. 6, the bonding region 30 is positioned between the holding portions 22 for a pair of ball bearings 12. In other words, the bonding region is positioned axially between two ball bearings 12. The stress reducing region 23 is typically formed in the center of the bonding region 30. The hub 14 and the sleeve 11 are typically attached to each other by an interference fit and bonding such that stress may occur between the sleeve 11 and the hub 14 in the bonded region 30. If the bonding region 30 is located in the holding portions 22, stress is typically applied to the ball bearings 12, and the normal rotation can be prevented by the occurrence of the hub distorting, as shown in FIG. 4. Thus, the bonding region is chosen so as to avoid the holding portions 22 for the ball bearings.

The sleeve 11 may be made of stainless steel with a coefficient of linear expansion $\alpha=17\times10^{-6}$ (/° C.), and the hub 14 may be made of aluminum with a coefficient of linear expansion $\alpha=23\times10^{-6}$ (/° C.). A small amount of bonding agent may be used to press fit the inner periphery of the hub 14 into the outer periphery of the sleeve 11. If the inner diameter of the hub within the bonding region is uniform, the various stresses related to the upper and lower ends of the bonding portion of the hub is shown in the left side (V) of FIG. 7. More specifically, FIG. 7 illustrates the radial stress vectors, Ar and Br, and the axial-stress vectors, At and Bt. The magnitudes of the radial stress vectors at their respective ends are equal (i.e., Ar=Br), but the magnitudes of the axial stress vectors are different (i.e., At≠Bt) because the shape of the hub 14 is asymmetrical with respect to the bearing center 21. The sum of the radial stress vectors and the axial stress vectors, also referred to as the total stress vectors, have the magnitudes and directions shown by the vectors A and B.

The distribution of the magnitudes of the total stress vectors is shown in the right side (F) of FIG. 7. For the embodiment shown in FIG. 7, the total stress vectors are distributed such that the magnitude is greater in the lower portion than in the upper portion.

Typically, the stress vectors are produced over the whole inner periphery of the hub when a temperature change occurs. As a result, the bonding portion of the hub 14 is unbalanced with the sleeve 11, which may cause distortion in the hub, resulting in a thermal runout (i.e., runout due to the temperature change). Furthermore, a runout may also occur in the disk-mounted on the hub.

FIG. 8 illustrates one embodiment of the bonding structure of the hub 14 and the sleeve 11. The internal diameter of the hub 14 in a central region 23 of the bonding region 30 is larger than the upper and lower bonding regions 24 and 25 in the bonding region 30. The central region 23 is the stress reducing region. The difference in the internal diameter between the central region and the upper and lower regions 24 and 25, respectively may be very small. In FIG. 8, the left side (V) illustrates the total stress vectors (i.e., A', A", B' and B") generated at the various points of the bonding region 30 for one embodiment. Stress vectors A' and B' are generated at the upper and lower bonding regions 24 and 25 of the bonding region 30, respectively, and stress vectors A" and B" are generated at the upper and lower bonding regions 24 and 25 of the stress reducing region 30, respectively. A stress distribution similar to FIG. 7 is shown in the right side (F) of FIG. 8. Although there is a difference between the magnitudes of the stress vectors at the upper and lower ends of the bonding region 30, the difference is small as compared with (F) of FIG. 7. For the embodiment shown in FIG. 8, there is substantially no stress in the stress reducing region 23 resulting from the difference in coefficients of linear expansion between the hub 14 and the sleeve 11. By reducing the difference in magnitude of the stress vectors between the lower bonding region 24 and the upper bonding region 25, the distortion generated in the hub is reduced, which results in the reduction of thermal runouts.

FIG. 9 illustrates another embodiment of the present invention. According to FIG. 9, the bonding region 40 between the hub 14 and the sleeve 11 is divided into an upper bonding region 41 (also referred to as the X region), a lower bonding region 43 (also referred to as the Y region), and a middle bonding region 42 (also referred to as the Z region). The upper bonding region 41 is separated from the middle bonding region 42 by the stress reducing region 44, and the lower bonding region 43 is separated from the middle bonding region 42 by the stress reducing region 45.

The stress reducing regions 44 and 45 may represent a groove or recess formed on the inner periphery of the hub that provides a reservoir for the bonding agent. For one embodiment, the total length of the bonding region 40 is 6 mm; the length of the X region is 1 mm; the length of the Y region is 2 mm; the length of the Z region is 1 mm; the length of the stress reducing region 44 is 1 mm; and the length of the stress reducing region 45 is 1 mm.

The bonding regions X, Y and Z may have a "tight" fit or a "loose" fit with the sleeve 11 when bonded. Thus, with a tight fit, the inner diameter of the hub is smaller, and with the loose fit, the inner diameter of the hub is larger. For one embodiment, the outer diameter of the sleeve 11 is 13 mm such that the inner diameter of the hub 14 is approximately (13 mm−10 μm) when there is a loose fit. The value 10 μm represents the difference between the expansion of the inner and the outer diameter of the hub, as discussed below.

FIG. 10 is a table illustrating the various fitting conditions for the embodiment shown in FIG. 9 when the thermal runout was measured for a temperature change from 25° C. to 60° C. The point P in FIG. 9 illustrates the point at which the thermal runout was measured.

The amount of vertical amplitude at the point P represents the value of the thermal runout. The thermal runout calculations in FIG. 10 assume a loose fit between the sleeve 11 and the stress reducing regions 44 and 45. FIG. 10 illustrates that the thermal runout may be varied by altering the fitting conditions of the bonding regions X, Y and Z. According to FIG. 10, the combination B of tight, loose, and tight fit of the bonding regions X, Y and Z respectively, is the combination that provides the lowest thermal runout.

The stress balance between the upper and lower ends of the bonding region should be taken into consideration when determining the proportion of the stress reducing region in the bonding region. If the proportion of stress reducing region in a bonding region is set too large, the entire bonding region may become a loose fit. The combination B illustrates the scenario in which the entire bonding region 40 is a loose fit. According to FIG. 10, the combination A provides the largest amount of thermal runout, and therefore, the least desirable of all the combinations shown in FIG. 10. On the other hand, if the proportion of the stress reducing region in the bonding region is too small, the stress reducing effect is not fully exhibited. Accordingly, for one embodiment, it is desirable to have at least a third of the bonding region represented by a stress reducing region.

The coefficient of linear expansion of each material, the operating temperature range of the motor to be used, and the diameter of the sleeve is typically taken into consideration when determining the inner diameter of the hub. For one embodiment, the following parameters may be used to determine the inner diameter of the hub having either a loose fit or a tight fit.

Hub: Aluminum $\alpha H = 23 \times 10^{-6}$ (/° C.)

Sleeve: Stainless steel $\alpha S = 17 \times 10^{-6}$ (/° C.)

Outer diameter of sleeve: L=13 mm

Operating temperature range: 5° C. to 55° C.
(temperature change=T=50° C.)

The expansion of the inner diameter of the hub and the expansion of the outer diameter of the sleeve in the operating temperature range are calculated as follows.

Expansion of inner diameter of hub:

$$L \times \alpha H \times T = 13 \times (23 \times 10^{-6}) \times 50 = 14.96 (\mu m)$$

Expansion of outer diameter of sleeve:

$$L \times \alpha H \times T = 13 \times (17 \times 10^{-6}) \times 50 = 11.06 (\mu m)$$

In the calculation formulas, the calculation is performed on the presumption that the inner diameter of the hub is the same as the outer diameter of the sleeve.

In order that the tight portion maintains the tight condition in the above operating temperature range, it is required that the inner diameter of the hub be 13 mm−3.90 μm or smaller. Similarly, in order that the loose portion maintains the loose condition in the operating temperature range, it is required that the inner diameter of the hub be 13 mm+3.90 μm or greater. The value 3.9 μm represents the difference between the expansion of the inner diameter of the hub and the expansion of the outer diameter of the hub. As a result, for one embodiment, the difference in inner diameter between the tight portion and the loose portion in the hub is 3.90+3.90=7.80 μm. As such, the inner diameter of the hub in the stress reducing region should be greater than the non-stress reducing regions by at least 7.80 μm for one embodiment.

The maximum difference (X) between the inner diameter A of the hub in the stress reducing region in the bonding region and the inner diameter B of the hub in the region other than the stress reducing region in the bonding region may be determined from the following equation. Assuming that the operating temperature range of the motor is T, the outer diameter of the sleeve is L, the coefficient of linear expansion of the hub is $\alpha H$, and the coefficient of linear expansion of the sleeve is $\alpha S$, $X = 2 \times (\alpha H - \alpha S) \times L \times T$.

As described above, in accordance with the arrangement of the present invention, a motor having less occurrence of distortion for temperature change and having high stability is provided in the fixing structure between the hub for-mounting disks and the sleeve of the bearing cartridge, whereby the reliability of the disk drive apparatus can be enhanced.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are accordingly, to be regarded in an illustrative rather than in a strict sense.

What is claimed is:

1. An apparatus for rotating at least one disk in a disk drive, comprising:
   a motor shaft;
   a bearing sleeve;
   two ball bearings positioned between an outer periphery of said motor shaft and an inner periphery of said bearing sleeve, wherein each of said ball bearings includes a plurality of balls;
   a hub having an inner periphery with only one bonding region, said bonding region having at least one annular recess and a plurality of contact regions, wherein said bonding region is positioned axially between said two ball bearings without being axially aligned with either of said two ball bearings and between an outer periphery of said bearing sleeve and said inner periphery of said hub, wherein an internal diameter of said hub at one of said annular recesses within said bonding region is greater than an internal diameter of said hub at each of said plurality of contact regions within said bonding region by at least a distance, said distance equals two times an outer diameter of said bearing sleeve multiplied by an operating temperature range of said apparatus multiplied by the differences between a coefficient of linear expansion of said hub and a coefficient of linear expansion of said sleeve; and
   a magnet attached to said hub and disposed outwardly of said bearing sleeve.

2. The apparatus of claim 1, wherein at least one of said annular recesses within said bonding region includes a first and a second recess, and wherein said plurality of contact regions includes a first, a second, and a third contact region.

3. The apparatus of claim 1, wherein each of said plurality of contact regions provides a tight fit or a loose fit between said inner periphery of said hub and said outer periphery of said sleeve.

4. The apparatus of claim 1, wherein at least one of said annular recesses provides a loose fit between said inner periphery of said hub and said outer periphery of said sleeve.

5. A disk drive system, comprising:

a disk;

a head positioned a predetermined distance above said disk; and a spindle motor including a motor shaft, a bearing sleeve, two ball bearings positioned between an outer periphery of said motor shaft and an inner periphery of said bearing sleeve, wherein each of said ball bearings includes a plurality of balls, a hub having an inner periphery with only one bonding region and an outer periphery attached to said disk, and a magnet attached to said hub and disposed outwardly of said bearing sleeve, said bonding region having at least one annular recess and a plurality of contact regions, wherein said bonding region is positioned axially between said two ball bearings without being axially aligned with either of said two ball bearings and between an outer periphery of said bearing sleeve and said inner periphery of said hub.

6. The disk drive system of claim 5, wherein at least one of said annular recesses provides a stress reducing region within said bonding region.

7. The disk drive system of claim 5, wherein said at least one annular recess is at least one-third the length of said bonding region.

8. A disk drive system, comprising:

a disk;

a head positioned a predetermined distance above said disk; and a spindle motor including a motor shaft, a bearing sleeve, two ball bearings positioned between an outer periphery of said motor shaft and an inner periphery of said bearing sleeve, wherein each of said ball bearings includes a plurality of balls, a hub having an inner periphery with only one bonding region and an outer periphery attached to said disk, and a magnet attached to said hub and disposed outwardly of said bearing sleeve, said bonding region having at least one annular recess and a plurality of contact regions, wherein said bonding region is positioned axially between said two ball bearings without being axially aligned with either of said two ball bearings and between an outer periphery of said bearing sleeve and said inner periphery of said hub, wherein an internal diameter of said hub at one of said annular recesses within said bonding region is greater than an internal diameter of said hub at each of said plurality of contact regions within said bonding region by at least a distance, said distance equals two times an outer diameter of said bearing sleeve multiplied by an operating temperature range of said apparatus multiplied by the differences between a coefficient of linear expansion of said hub and a coefficient of linear expansion of said sleeve.

9. The disk drive system of claim 8, wherein at least one of said annular recesses within said bonding region includes a first and a second recess, and wherein said plurality of contact regions includes a first, a second, and a third contact region.

10. The disk drive system of claim 8, wherein each of said plurality of contact regions provides a tight fit or a loose fit between said inner periphery of said hub and said outer periphery of said sleeve.

11. The disk drive system of claim 8, wherein at least one of said annular recesses provides a loose fit between said inner periphery of said hub and said outer periphery of said sleeve.

* * * * *